United States Patent
Heo (10) Patent No.: US 9,148,062 B2
(45) Date of Patent: Sep. 29, 2015

(54) POWER FACTOR CORRECTION APPARATUS, POWER SUPPLYING APPARATUS AND MOTOR DRIVING APPARATUS HAVING THE SAME

(71) Applicant: SAMSUNG ELECTRO-MECHANICS CO., LTD., Suwon, Gyunggi-do (KR)

(72) Inventor: Chang Jae Heo, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 330 days.

(21) Appl. No.: 13/757,064

(22) Filed: Feb. 1, 2013

(65) Prior Publication Data

US 2014/0132191 A1    May 15, 2014

(30) Foreign Application Priority Data

Nov. 15, 2012  (KR) .................. 10-2012-0129450

(51) Int. Cl.

| H02P 11/00 | (2006.01) |
|---|---|
| H02H 7/06 | (2006.01) |
| H02P 9/00 | (2006.01) |
| H02M 3/335 | (2006.01) |
| G05F 1/613 | (2006.01) |
| H02M 1/42 | (2007.01) |
| H02P 23/00 | (2006.01) |

(Continued)

(52) U.S. Cl.
CPC ........... *H02M 3/33546* (2013.01); *G05F 1/613* (2013.01); *H02M 1/42* (2013.01); *H02M 1/4225* (2013.01); *H02P 23/0081* (2013.01); *H02M 3/158* (2013.01); *H02M 5/458* (2013.01); *H02M 2001/0054* (2013.01); *Y02B 70/126* (2013.01); *Y02B 70/1491* (2013.01)

(58) Field of Classification Search
USPC .................. 322/20; 323/207, 222; 363/89
See application file for complete search history.

(56) References Cited

U.S. PATENT DOCUMENTS

| 4,677,366 A | * | 6/1987 | Wilkinson et al. ............ 323/222 |
| 5,001,620 A | * | 3/1991 | Smith ............................. 363/89 |

(Continued)

FOREIGN PATENT DOCUMENTS

| JP | 06-311738 A | 11/1994 |
| JP | 2003-070249 A | 3/2003 |
| JP | 2010-273431 A | 12/2010 |

OTHER PUBLICATIONS

Office Action issued on Dec. 18, 2013 in the corresponding Korean patent application No. 10-2012-0129450.

(Continued)

*Primary Examiner* — Pedro J Cuevas
(74) *Attorney, Agent, or Firm* — McDermott Will & Emery LLP (57) ABSTRACT

There are provided a power factor correction apparatus capable of driving a main switch and an auxiliary switch using a single driving signal, and a power supplying apparatus and a motor driving apparatus having the same, the power factor correction apparatus including: a power factor correction unit having a main switch switching input power to correct a power factor of the input power and an auxiliary switch turned on before the main switch is turned on to form a transfer path for surplus power; and a control unit controlling operations of the main switch and the auxiliary switch based on a single input signal.

32 Claims, 7 Drawing Sheets

(51) Int. Cl.
*G05F 5/00* (2006.01)
*G05F 1/00* (2006.01)
*H02M 5/42* (2006.01)
*H02M 5/458* (2006.01)
*H02M 1/00* (2007.01)
*H02M 3/158* (2006.01)

(56) References Cited

U.S. PATENT DOCUMENTS

| | | | | |
|---|---|---|---|---|
| 5,003,454 A * | 3/1991 | Bruning | | 363/81 |
| 5,289,046 A * | 2/1994 | Gregorich et al. | | 307/66 |
| 5,349,284 A * | 9/1994 | Whittle | | 323/207 |
| 5,644,214 A * | 7/1997 | Lee | | 323/211 |
| 5,764,039 A * | 6/1998 | Choi et al. | | 323/222 |
| 5,818,707 A * | 10/1998 | Seong et al. | | 363/89 |
| 6,191,565 B1 * | 2/2001 | Lee et al. | | 323/222 |
| 6,222,746 B1 * | 4/2001 | Kim | | 363/89 |
| 6,259,613 B1 * | 7/2001 | Lee et al. | | 363/89 |
| 6,448,744 B1 * | 9/2002 | Malik et al. | | 323/207 |
| 6,465,990 B2 * | 10/2002 | Acatrinei et al. | | 323/222 |
| 6,487,098 B2 * | 11/2002 | Malik et al. | | 363/89 |
| 6,531,854 B2 * | 3/2003 | Hwang | | 323/285 |
| 6,946,819 B2 * | 9/2005 | Fagnani et al. | | 323/207 |
| 6,949,915 B2 * | 9/2005 | Stanley | | 323/207 |
| 6,984,963 B2 * | 1/2006 | Pidutti et al. | | 323/207 |
| 6,984,964 B2 * | 1/2006 | Chang | | 323/207 |
| 7,042,743 B2 * | 5/2006 | Pidutti et al. | | 363/89 |
| 7,064,527 B2 * | 6/2006 | Adragna | | 323/207 |
| 7,088,081 B2 * | 8/2006 | Takahashi et al. | | 323/222 |
| 7,164,591 B2 * | 1/2007 | Soldano | | 363/89 |
| 7,180,273 B2 * | 2/2007 | Bocchiola et al. | | 323/207 |
| 7,183,753 B2 * | 2/2007 | Tsuruya | | 323/222 |
| 7,205,749 B2 * | 4/2007 | Hagen et al. | | 323/222 |
| 7,239,120 B2 * | 7/2007 | Adragna et al. | | 323/285 |
| 7,250,742 B2 * | 7/2007 | Li | | 323/207 |
| 7,279,868 B2 * | 10/2007 | Lanni | | 323/222 |
| 7,307,405 B2 * | 12/2007 | Adragna et al. | | 323/207 |
| RE40,016 E * | 1/2008 | Ribarich et al. | | 363/89 |
| 7,359,224 B2 * | 4/2008 | Li | | 363/89 |
| 7,397,678 B2 * | 7/2008 | Frank et al. | | 363/89 |
| 7,489,116 B2 * | 2/2009 | Lanni | | 323/222 |
| 7,495,410 B2 * | 2/2009 | Zargari et al. | | 318/729 |
| 7,919,950 B2 * | 4/2011 | Uno et al. | | 323/207 |
| 8,004,262 B2 * | 8/2011 | Saint-Pierre | | 323/284 |
| 8,040,114 B2 * | 10/2011 | Saint-Pierre | | 323/222 |
| 8,102,160 B2 * | 1/2012 | Woo et al. | | 323/249 |
| 8,120,347 B1 * | 2/2012 | Cao | | 323/285 |
| 8,154,269 B2 * | 4/2012 | Wu | | 323/301 |
| 8,164,930 B2 * | 4/2012 | Tan et al. | | 363/44 |
| 8,213,135 B2 * | 7/2012 | Kim et al. | | 361/18 |
| 8,232,780 B2 * | 7/2012 | Uno | | 323/222 |
| 8,344,706 B2 * | 1/2013 | Green | | 323/207 |
| 8,358,098 B2 * | 1/2013 | Skinner et al. | | 318/729 |
| 8,482,942 B2 * | 7/2013 | Choi | | 363/37 |
| 8,487,601 B2 * | 7/2013 | Saint-Pierre | | 323/284 |
| 8,508,166 B2 * | 8/2013 | Marcinkiewicz et al. | | 318/438 |
| 8,513,926 B2 * | 8/2013 | Park et al. | | 323/207 |
| 8,525,493 B2 * | 9/2013 | Saint-Pierre | | 323/222 |
| 8,537,582 B2 * | 9/2013 | Saint-Pierre | | 363/97 |
| 8,564,991 B2 * | 10/2013 | Zhang et al. | | 363/89 |
| 8,674,544 B2 * | 3/2014 | Rada et al. | | 307/38 |
| 8,693,213 B2 * | 4/2014 | Jungreis et al. | | 363/17 |
| 8,716,985 B2 * | 5/2014 | Ku et al. | | 323/207 |
| 8,749,212 B2 * | 6/2014 | Saint-Pierre | | 323/266 |
| 8,791,677 B2 * | 7/2014 | Yang et al. | | 323/283 |
| 8,823,336 B2 * | 9/2014 | Yin et al. | | 323/222 |
| 8,937,462 B2 * | 1/2015 | Park et al. | | 323/207 |
| 8,963,449 B2 * | 2/2015 | Melanson | | 315/307 |
| 9,019,735 B2 * | 4/2015 | Jeong et al. | | 363/90 |
| 9,025,347 B2 * | 5/2015 | Melanson et al. | | 363/21.07 |
| 9,036,386 B2 * | 5/2015 | Earanky | | 363/89 |
| 2002/0140407 A1 * | 10/2002 | Hwang | | 323/207 |
| 2003/0043602 A1 | 3/2003 | Morita et al. | | 363/24 |
| 2005/0017695 A1 * | 1/2005 | Stanley | | 323/207 |
| 2005/0024023 A1 * | 2/2005 | Chang | | 323/207 |
| 2005/0201124 A1 * | 9/2005 | Lanni | | 363/16 |
| 2005/0226015 A1 * | 10/2005 | Tsuruya | | 363/89 |
| 2006/0132104 A1 * | 6/2006 | Li | | 323/207 |
| 2006/0245219 A1 * | 11/2006 | Li | | 363/89 |
| 2007/0296380 A1 * | 12/2007 | Lanni | | 323/222 |
| 2008/0019154 A1 * | 1/2008 | Lanni | | 363/36 |
| 2008/0265847 A1 * | 10/2008 | Woo et al. | | 323/206 |
| 2008/0285318 A1 * | 11/2008 | Tan et al. | | 363/89 |
| 2009/0015214 A1 * | 1/2009 | Chen | | 323/205 |
| 2009/0316454 A1 * | 12/2009 | Colbeck et al. | | 363/89 |
| 2010/0014329 A1 * | 1/2010 | Zhang et al. | | 363/89 |
| 2010/0270984 A1 * | 10/2010 | Park et al. | | 323/211 |
| 2011/0095732 A1 * | 4/2011 | Park et al. | | 323/207 |
| 2011/0242862 A1 * | 10/2011 | Westberg | | 363/89 |
| 2012/0044729 A1 * | 2/2012 | Coleman et al. | | 363/126 |
| 2012/0051107 A1 * | 3/2012 | Choi | | 363/126 |
| 2012/0262132 A1 * | 10/2012 | Park et al. | | 323/207 |
| 2013/0021005 A1 * | 1/2013 | Saint-Pierre | | 323/205 |
| 2015/0054421 A1 * | 2/2015 | Auer et al. | | 315/247 |
| 2015/0062985 A1 * | 3/2015 | Colbeck, Roger | | 363/89 |
| 2015/0062986 A1 * | 3/2015 | Park et al. | | 363/89 |

OTHER PUBLICATIONS

Korean Office Action issued in Korean Application No. 10-2014-0154766 dated Jan. 19, 2015, with English Translation.

* cited by examiner

POWER FACTOR CORRECTION APPARATUS, POWER SUPPLYING APPARATUS AND MOTOR DRIVING APPARATUS HAVING THE SAME

CROSS-REFERENCE TO RELATED APPLICATIONS

This application claims the priority of Korean Patent Application No. 10-2012-0129450 filed on Nov. 15, 2012, in the Korean Intellectual Property Office, the disclosure of which is incorporated herein by reference.

BACKGROUND OF THE INVENTION

1. Field of the Invention

The present invention relates to a power factor correction apparatus capable of reducing switching loss, and a power supplying apparatus and a motor driving apparatus having the same.

2. Description of the Related Art

Recently, the governments of several countries have encouraged the efficient use of energy according to energy efficiency policies, and in particular, the efficient use of energy in electronic products and home appliances has been widely encouraged.

In efficiently using energy according to this government encouragement, improved circuits for efficiently using energy are mainly used in power supplying apparatuses supplying power to electronic products, home appliances, or the like.

As an example of an improved circuit as described above, there is provided a power factor correction circuit, wherein the power factor correction circuit is a circuit allowing power to be efficiently transferred to a rear end thereof by switching input power to adjust a phase difference (power factor) between current and voltage of the input power. However, the power factor correction circuit may also switch the input power to generate a switching loss.

Meanwhile, a motor is frequently used in order to perform a preset operation in electronic products, home appliances, and the like. In order to drive the motor therein, suitable power should be supplied thereto. Similarly, the power factor correction circuit for improving energy efficiency may be used in the power supplying apparatus to thereby adjust the phase difference between the current and the voltage of the input power by switching the input power, but there is a problem in that the switching loss may be generated at the time of switching the input power.

In order to solve this problem, a technology of providing a plurality of switches to reduce the switching loss in the power factor correction circuit has been disclosed in the related art document, but a circuit for driving the switches may become complicated, such that a circuit area and manufacturing costs may increase.

RELATED ART DOCUMENT (Patent Document 1) Japanese Patent Laid-open Publication No. 2010-273431

SUMMARY OF THE INVENTION

An aspect of the present invention provides a power factor correction apparatus capable of driving a main switch and an auxiliary switch using a single driving signal, and a power supplying apparatus and a motor driving apparatus having the same.

According to an aspect of the present invention, there is provided a power factor correction apparatus including: a power factor correction unit having a main switch switching input power to correct a power factor of the input power and an auxiliary switch turned on before the main switch is turned on to form a transfer path for surplus power; and a control unit controlling operations of the main switch and the auxiliary switch based on a single input signal.

The control unit may include: a main signal generator generating a main signal by delaying a rising timing and a falling timing of the single input signal by a preset time, respectively; and an auxiliary signal generator generating an auxiliary signal having the same rising timing as that of the single input signal and a falling timing shortened as compared to that of the single input signal.

The control unit may further include an output unit receiving the main signal of the main signal generator and the auxiliary signal of the auxiliary signal generator to output a main switching signal and an auxiliary switching signal, respectively.

The output unit may include: a first output unit having a first inverter inverting a signal level of the main signal of the main signal generator and a first transistor unit having a first p-channel metal oxide semiconductor (PMOS) transistor connected between a driving power supply and a ground and a first n-channel metal oxide semiconductor (NMOS) transistor connected between the first PMOS transistor and the ground and outputting the main switching signal obtained by adjusting a rising timing and a falling timing of the main signal; and a second output unit having a second inverter inverting a signal level of the auxiliary signal of the auxiliary signal generator and a second transistor unit having a second PMOS transistor connected between the driving power supply and the ground and a second NMOS transistor connected between the second PMOS transistor and the ground and outputting the auxiliary switching signal obtained by adjusting the rising timing and the falling timing of the auxiliary signal the auxiliary switching signal having a rising timing delayed as compared to that of the input signal.

The first transistor unit may include at least one resistor connected between the first PMOS transistor and the first NMOS transistor or connected between a connection point of the first PMOS transistor and the first NMOS transistor and an output terminal.

The second transistor unit may include at least one resistor connected between the second PMOS transistor and the second NMOS transistor or connected between a connection point of the second PMOS transistor and the second NMOS transistor and an output terminal.

Each of the main signal generator and the auxiliary signal generator may include a delay unit delaying the rising timing or the falling timing of the single input signal.

The auxiliary signal generator may further include an inverter inverting a level of an output signal of the delay unit, and an AND gate performing a logical AND operation between an output signal of the inverter and the single input signal.

The auxiliary signal generator may delay a rising timing or a falling timing of the signal delayed by the main signal generator.

The delay unit may include at least two inverters connected to each other in series and a capacitor connected between a connection point of the two inverters and the ground.

The capacitor of the delay unit of the main signal generator may have capacitance higher than that of the capacitor of the delay unit of the auxiliary signal generator.

The delay unit may further include at least two of a transistor, a resistor, and a current source that are connected between the two inverters.

The power factor correction unit may further include: a first inductor having one end receiving rectified power and the other end connected to a drain of the main switch; and a second inductor having one end connected to the other end of the first inductor and the other end connected to a drain of the auxiliary switch.

According to another aspect of the present invention, there is provided a power supplying apparatus including: a power factor correction circuit including a power factor correction unit having a main switch switching rectified power to correct a power factor of input power, an auxiliary switch turned on before the main switch is turned on to form a transfer path for surplus power, a first inductor having one end receiving the rectified power and the other end connected to a drain of the main switch, and a second inductor having one end connected to the other end of the first inductor and the other end connected to a drain of the auxiliary switch, and including a control unit controlling operations of the main switch and the auxiliary switch based on a single input signal; and a power conversion circuit converting the power having the corrected power factor from the power factor correction circuit into power having a preset voltage level.

The power conversion circuit may be an inverter circuit inverting the power having the corrected power factor to convert the power into preset alternating current (AC) power.

According to another aspect of the present invention, there is provided a motor driving apparatus including: a power factor correction circuit including a power factor correction unit having a main switch switching rectified power to correct a power factor of input power, an auxiliary switch turned on before the main switch is turned on to form a transfer path for surplus power, a first inductor having one end receiving the rectified power and the other end connected to a drain of the main switch, and a second inductor having one end connected to the other end of the first inductor and the other end connected to a drain of the auxiliary switch, and including a control unit controlling operations of the main switch and the auxiliary switch based on a single input signal; and an inverter circuit inverting the power having the corrected power factor from the power factor correction circuit into preset AC power to drive a motor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

It will be understood that when an element is referred to as being "connected to" another element, it can be directly connected to the other element or may be indirectly connected to the other element with element(s) interposed therebetween. Unless explicitly described to the contrary, the word "comprise" and variations such as "comprises" or "comprising," will be understood to imply the inclusion of stated elements but not the exclusion of any other elements.

Throughout the drawings, the same or like reference numerals will be used to designate the same or like elements.

Figure 1:
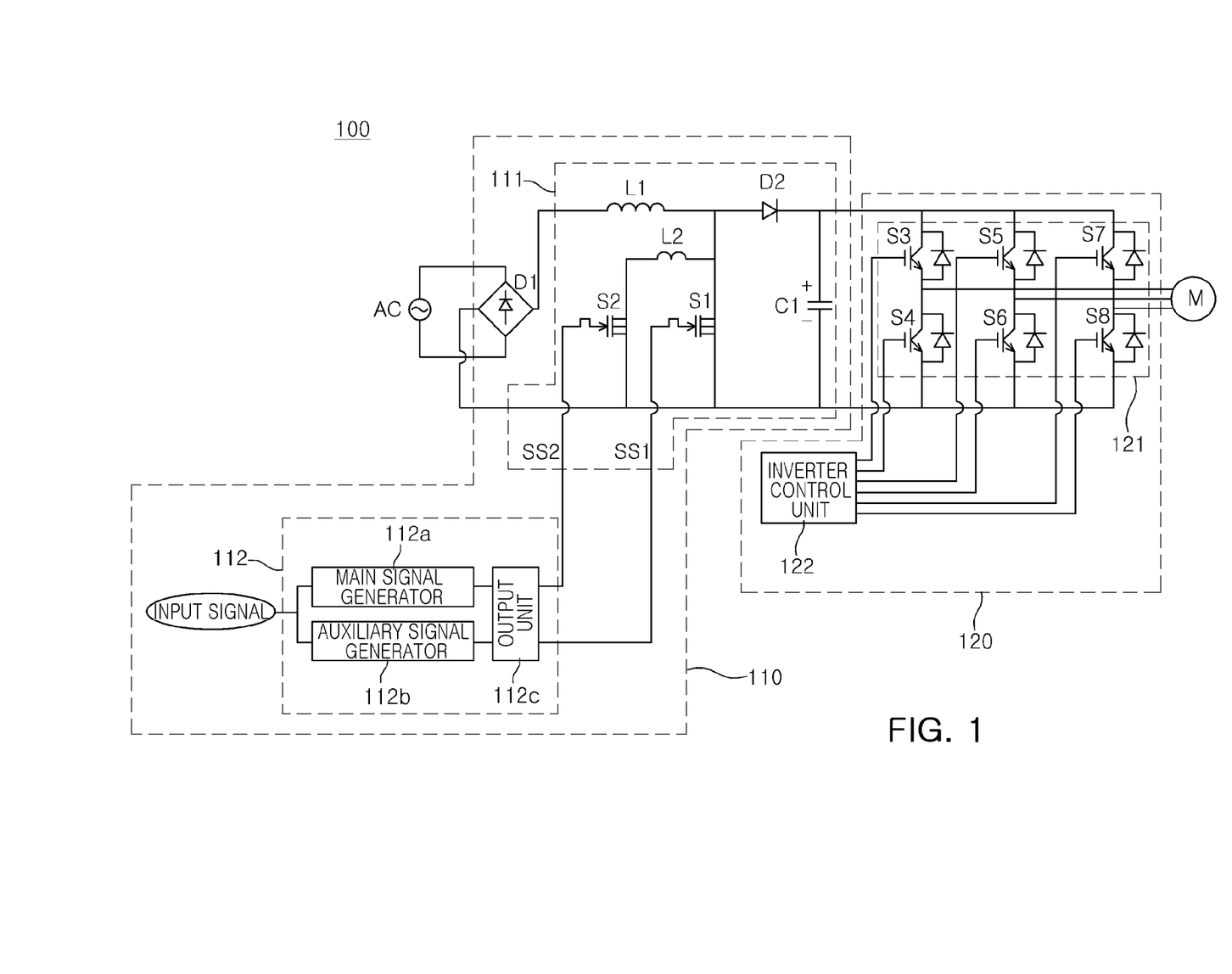
FIG. 1 is a schematic circuit diagram of a power supplying apparatus (motor driving apparatus) according to an embodiment of the present invention.

FIG. 1 is a schematic circuit diagram of a power supplying apparatus (motor driving apparatus) according to an embodiment of the present invention.

Referring to FIG. 1, a power supplying apparatus 100 according to the embodiment of the present invention may include a power factor correction circuit 110 and an inverter circuit 120.

The power factor correction circuit 110 may correct a power factor by switching rectified power obtained by rectifying alternating current (AC) power through bridge diode D1 and adjusting a phase difference between current and voltage.

To this end, the power factor correction circuit 110 may include a power factor correction unit 111 and a control unit 112. The power factor correction unit 111 may include first and second inductors L1 and L2 charging/discharging energy according to switching, a main switch S1 switching the rectified power to correct a power factor, and an auxiliary switch S2 forming a transfer path for surplus power generated by a switching operation of the main switch S1.

The auxiliary switch S2 is turned on before the main switch S1 is turned on, and is turned off before the main switch S1 is turned off, to thereby form the transfer path for the surplus power generated by the switching operation of the main switch S1, such that switching loss may be reduced.

In addition, the power factor correction unit 110 may include a diode D2 stabilizing the power having the power factor and a capacitor C1.

In order to control switching operations of the above-mentioned main switch S1 and the auxiliary switch S2, the control unit 112 may include a main signal generator 112a, an auxiliary signal generator 112b, and an output unit 112c.

The control unit 112 may provide a main switching signal ss1 and an auxiliary switching signal ss2 controlling the switching operations of the main switch S1 and the auxiliary switch S2 based on a single input signal to reduce a circuit area and manufacturing costs.

The inverter circuit 120 may include an inverter 121 and an inverter control unit 122. The inverter 121 may invert direct current (DC) power having corrected power factor to output AC power having a preset voltage level, and the output AC power may drive a motor.

The inverter control unit 122 may control an inverting operation to control an output of AC power and control driving of the motor in the case in which the AC power from the inverter 121 is supplied to the motor.

Therefore, the power supplying apparatus 100 according to the embodiment of the present invention may be a motor driving apparatus.

Figure 2:
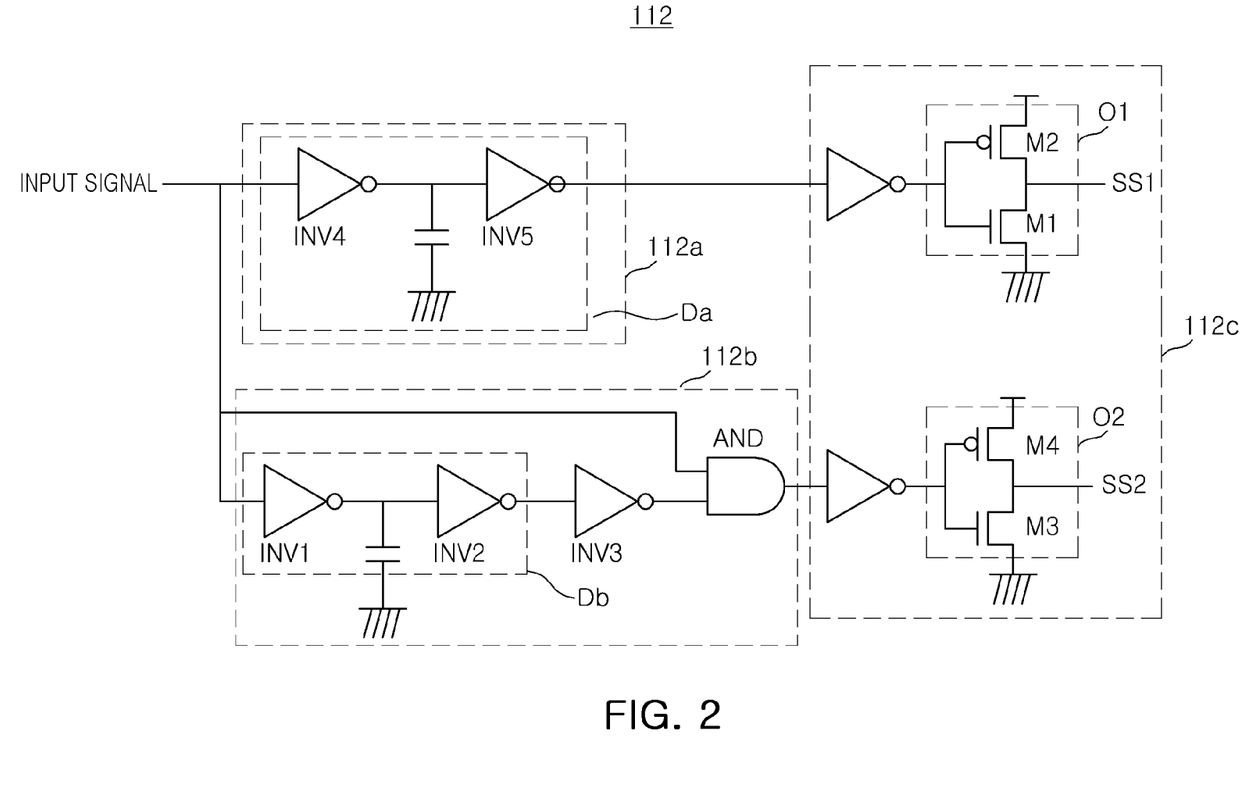
FIG. 2 is a schematic circuit diagram of a control unit of a power factor correction circuit provided in the power supplying apparatus according to the embodiment of the present invention.

FIG. 2 is a schematic circuit diagram of the control unit of the power factor correction circuit provided in the power supplying apparatus according to the embodiment of the present invention.

Referring to FIG. 2, the control unit 112 of the power factor correction circuit 110 used in the power supplying apparatus according to the embodiment of the present invention may include the main signal generator 112a, the auxiliary signal generator 112b, and the output unit 112c, as described above.

The main signal generator 112a and the auxiliary signal generator 112b may include a single delay unit Da and Db, respectively, and the auxiliary signal generator 112b may further include an inverter INV3 and an AND gate AND.

The delay units Da and Db may include two inverters INV1 and INV2 or INV4 and INV5 connected to each other in series, and a capacitor connected between a connection point of the inverters INV1 and INV2 or INV4 and INV5 and the ground, respectively.

The two inverters INV1 and INV2 or INV4 and INV5 may invert a level of an input signal and then reinvert the inverted level of the input signal, and the capacitor may delay a rising timing or falling timing of the input signal according to capacitance.

The AND gate AND may perform a logical AND operation between an output signal of the inverter INV3 inverting an output of the delay unit Db and an input signal to transfer the result to the output unit 112c.

Although not shown, the delay unit Db of the auxiliary signal generator 112b may receive an output signal of the delay unit Da of the main signal generator 112a to invert the received signal, in order to generate the auxiliary switching signal ss2 having a rising timing faster than that of the main switching signal ss1.

FIGS. 4A through 4D are circuit diagrams schematically showing various embodiments of the delay unit of the control unit shown in FIG. 2.

Referring to FIGS. 4A through 4D, the delay unit may further include a resistor R and a transistor M or a current source So and a transistor M, as well as a capacitor C between first and second inverters I1 and I2.

Figure 4A:
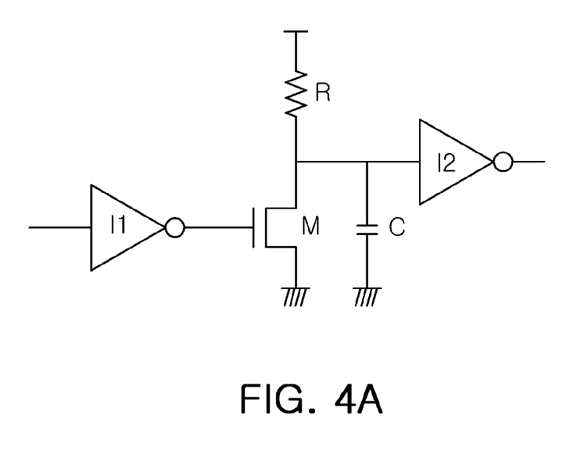
FIGS. 4A through 4D are circuit diagrams schematically showing various embodiments of a delay unit of the control unit shown in FIG. 2.
Figure 4B:
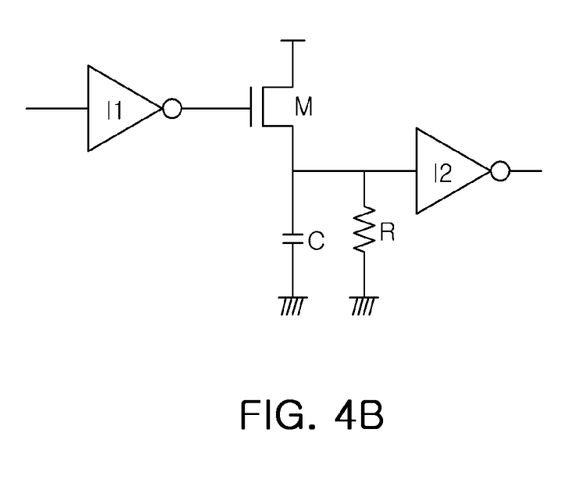

More specifically, referring to FIGS. 4A and 4B, the transistor M having a gate connected to an output terminal of the first inverter I1, a drain connected to one end of the resistor R, and a source connected to the ground may be connected between the output terminal of the first inverter I1 and an input terminal of the second inverter I2. The other end of the resistor R may be connected to a power terminal, and the capacitor C may be connected between a connection point of the drain of the transistor M and the input terminal of the second inverter I2 and the ground.

In addition, the transistor M having a gate connected to an output terminal of the first inverter I1, a drain connected to a power terminal, and a source connected to the capacitor C may be connected between the output terminal of the first inverter I1 and the input terminal of the second inverter I2. The capacitor C may be connected between the source of the transistor M and the ground, and the resistor R may be connected between a connection point of the source of the transistor M and the input terminal of the second inverter I2 and the ground.

Figure 4C:
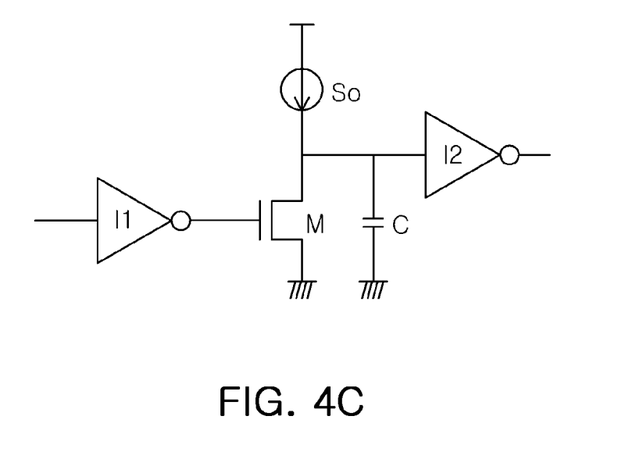
Figure 4D:
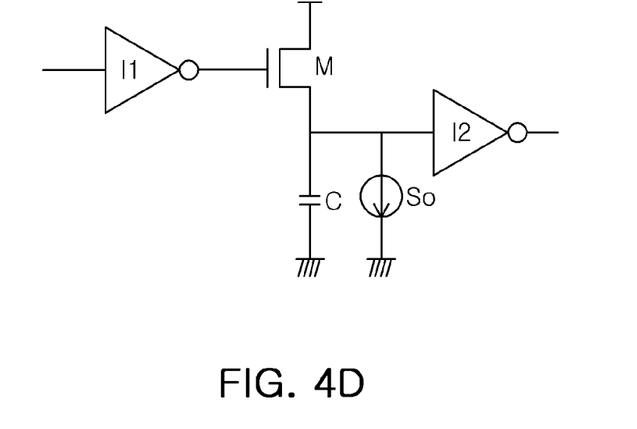

Referring to FIGS. 4C and 4D, the transistor M having a gate connected to the output terminal of the first inverter I1, a drain connected to one end of the current source So, and a source connected to the ground may be connected between the output terminal of the first inverter I1 and the input terminal of the second inverter I2. The other end of the current source So may be connected to the power terminal, and the capacitor C may be connected between a connection point of the drain of the transistor M and the input terminal of the second inverter I2 and the ground.

In addition, the transistor M having a gate connected to the output terminal of the first inverter I1, a drain connected to the power terminal, and a source connected to the capacitor C may be connected between the output terminal of the first inverter I1 and the input terminal of the second inverter I2. The capacitor C may be connected between the source of the transistor M and the ground, and the current source So may be connected between a connection point of the source of the transistor M and the input terminal of the second inverter I2 and the ground.

The output unit 112c may include at least two inverters and first and second transistor units O1 and O2 connected to output terminals of the two inverters, respectively.

Each of the first and second transistor units O1 and O2 may be formed of a p-channel metal oxide semiconductor (PMOS) transistor and an n-channel metal oxide semiconductor (NMOS) transistor connected in series between a power terminal and a ground terminal.

Figure 5A:
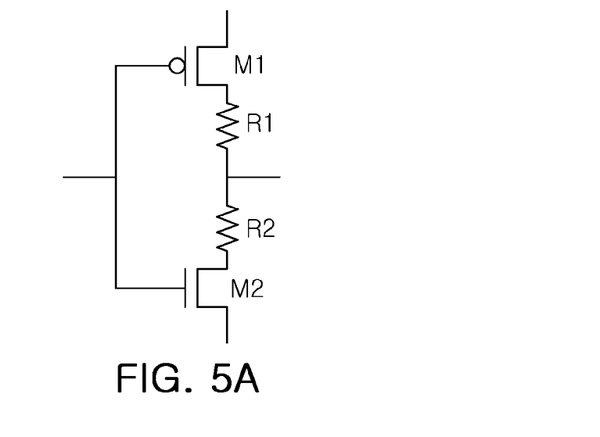
FIGS. 5A through 5C are circuit diagrams schematically showing various embodiments of a transistor unit of the control unit shown in FIG. 2.
Figure 5B:
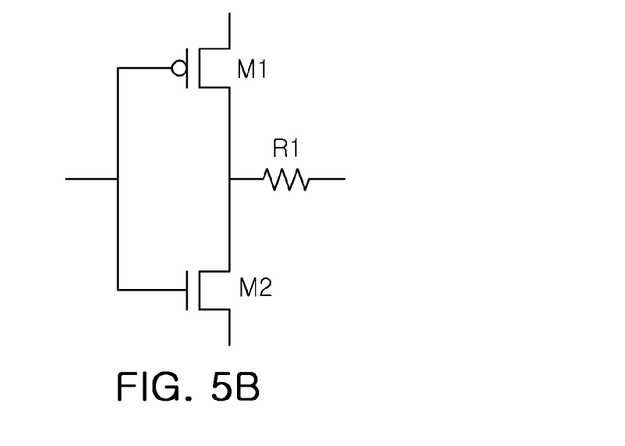
Figure 5C:
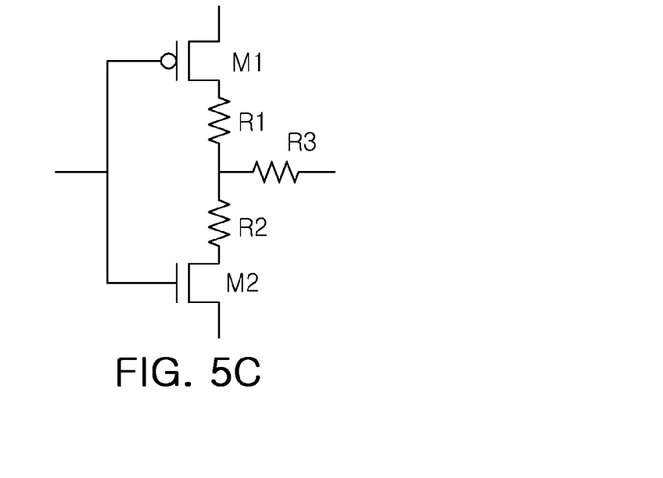

FIGS. 5A through 5C are circuit diagrams schematically showing various embodiments of a transistor unit of the control unit shown in FIG. 2.

Referring to FIGS. 5A through 5C, at least one of resistors R1 to R3 may be connected between a PMOS transistor M1 and an NMOS transistor M2.

More specifically, first and second resistors R1 and R2 connected to each other in series may be connected between a source of the PMOS transistor M1 and a drain of the NMOS transistor M2, and a connection point of the first and second resistors R1 and R2 may be connected to an output terminal from which the main switching signal or the auxiliary switching signal is output.

In addition, the first resistor R1 may be connected between the connection point of the source of the PMOS transistor M1 and the drain of the NMOS transistor M2 and the output terminal from which the main switching signal or the auxiliary switching signal is output. The first and second resistors R1 and R2 connected to each other in series may be connected between the source of the PMOS transistor M1 and the drain of NMOS transistor M2, and the third resistor R3 may be connected between a connection point of the first and second resistors R1 and R2 and the output terminal from which the main switching signal or the auxiliary switching signal is output.

FIGS. 3A through 3D are signal waveform graphs of a main switching signal and an auxiliary switching signal by the control unit shown in FIG. 2.

First, referring to FIGS. 1 through 3A, the auxiliary signal generator 112b may output an auxiliary signal C having a falling timing shortened as compared with that of an input signal A.

Figure 3A:
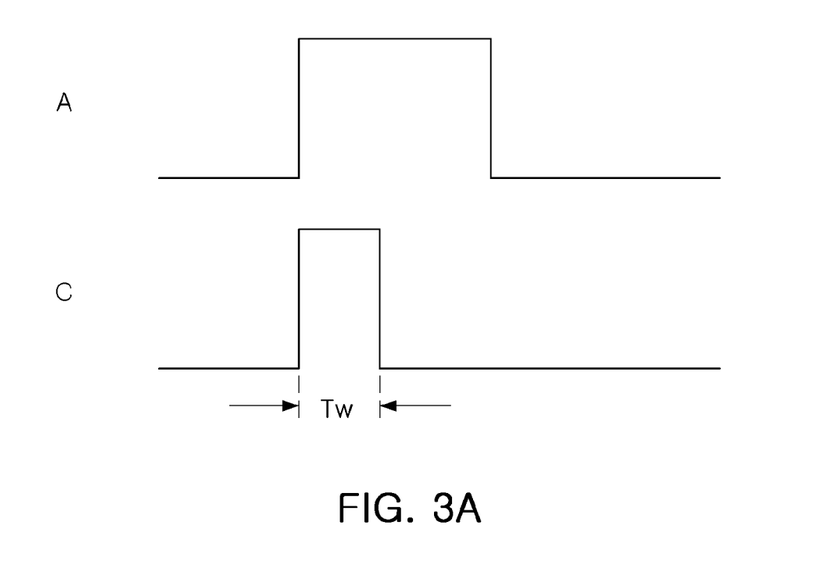
FIGS. 3A through 3D are signal waveform graphs of main and auxiliary switching signals by the control unit shown in FIG. 2.
Figure 3B:
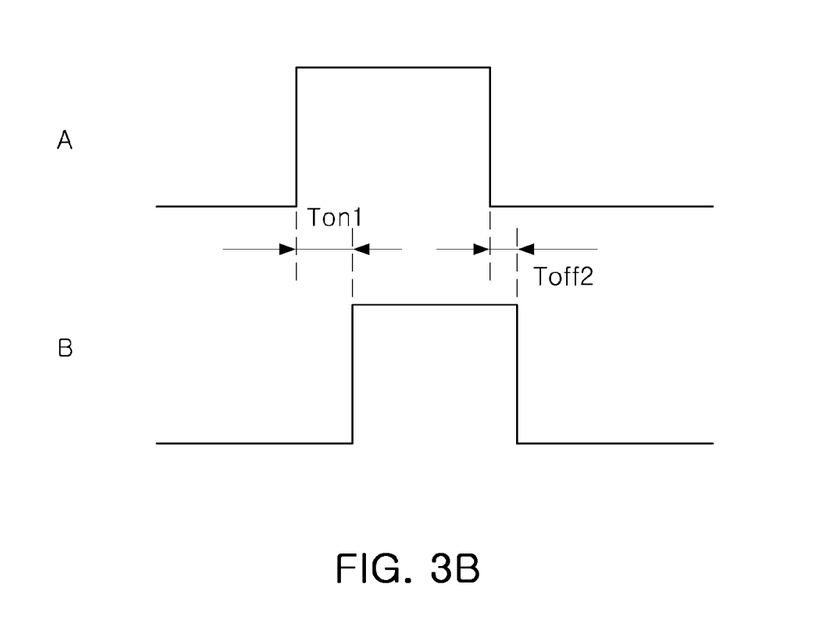

Next, referring to FIG. 3B, the main signal generator 112a may output a main signal B of which a rising timing and a falling timing are delayed as compared with those of the input signal A.

Figure 3C:
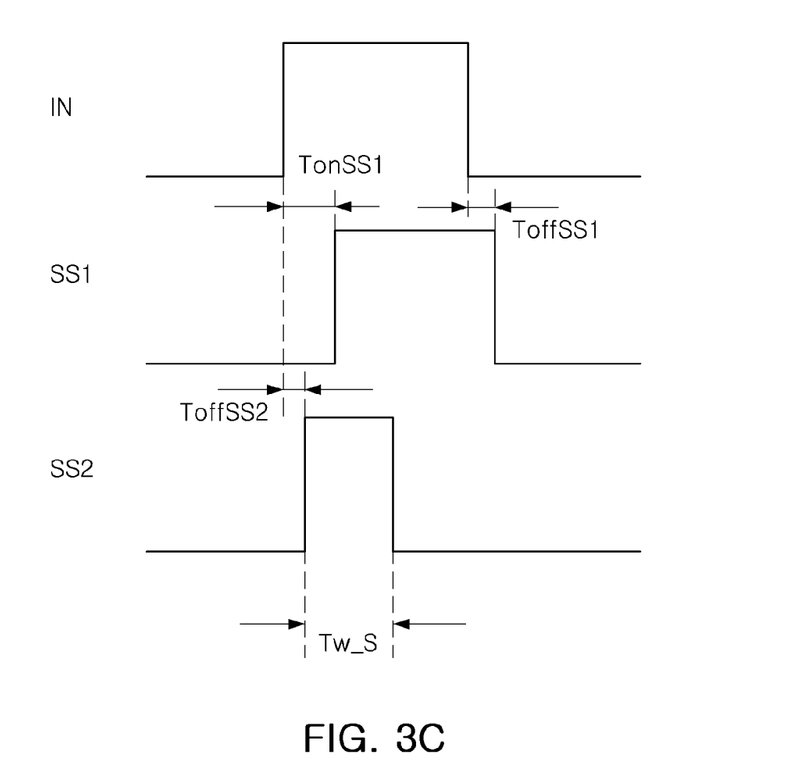
Figure 3D:
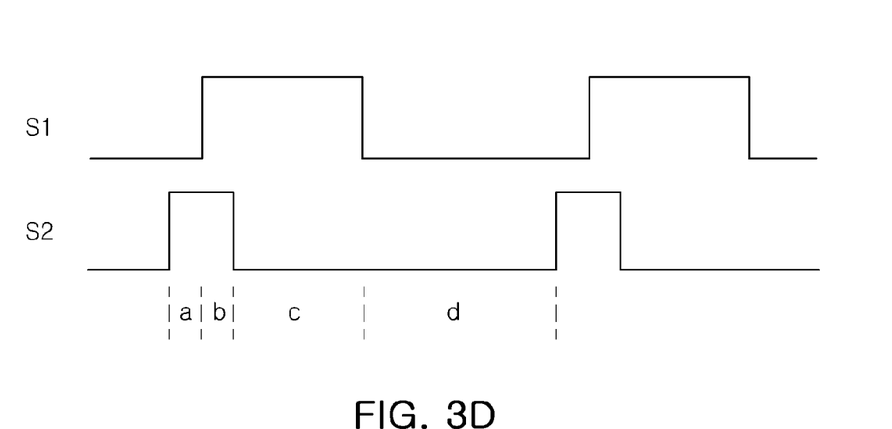

Referring to FIGS. 3A, 3B, and 3D, operating regions of the main switch S1 and the auxiliary switch S2 may be divided into four regions a, b, c, and d, as shown in FIG. 3D.

The a region refers to a region in which only the auxiliary switch S2 is turned on in order to remove the switching loss by switching of the main switch S1, which is the same as a Ton1 region of FIG. 3b. Here, the Ton1 region may be formed by the inverters INV4 and INV5 of the delay unit Da and the capacitance of the capacitor C4. Therefore, the capacitance of the capacitor C4 of the delay unit Da in the main signal generator 112a may be higher than that of the capacitor C3 of the delay unit Db in the auxiliary signal generator 112b.

Meanwhile, the b region refers to a region in which the main switch S1 and the auxiliary switch S2 are simultaneously turned on, and the a and b regions are the same as a Tw region, which is a width of a high level of the auxiliary signal C of FIG. 3A. Here, the Tw region may be formed by the inverters INV1 and INV2 of the delay unit Db and the capacitance of the capacitor C3.

Finally, the c region refers to a region in which only the main switch S1 is turned on, and the d region refers to a region in which the main switch S1 and the auxiliary switch S2 are turned off and are not operated.

Referring to FIG. 3C, in the case of the main switching signal ss1 and the auxiliary switching signal ss2 output from the output unit 112c, based on the input signal IN, the auxiliary switching signal ss2 may be formed to have a rising timing delayed as compared to that of the input signal IN and faster than that of the main switching signal ss1, and the main switching signal ss1 may be formed to have a falling timing slower than that of the input signal IN. Timing intervals Tonss1, Toffss1, Tonss2, and Tw_s shown in FIG. 3C may be formed by the main signal generator 112a, the auxiliary signal generator 112b, and the output unit 112c of the control unit 112.

As set forth above, according to embodiments of the present invention, a main switch and an auxiliary switch may be driven by a single driving signal, whereby a circuit area and manufacturing costs may be reduced.

While the present invention has been shown and described in connection with the embodiments, it will be apparent to those skilled in the art that modifications and variations can be made without departing from the spirit and scope of the invention as defined by the appended claims.

What is claimed is:

1. A power factor correction apparatus comprising:
a power factor correction unit having a main switch switching input power to correct a power factor of the input power and an auxiliary switch turned on before the main switch is turned on to form a transfer path for surplus power; and
a control unit controlling operations of the main switch and the auxiliary switch based on a single input signal,
wherein the main switch corrects the power factor of the input power by switching a power of a first inductor, and
wherein the auxiliary switch forms the transfer path by switching a power of a second inductor which is connected to the first inductor.

2. The power factor correction apparatus of claim 1, wherein the control unit includes:
a main signal generator generating a main signal by delaying a rising timing and a falling timing of the single input signal by a preset time, respectively; and
an auxiliary signal generator generating an auxiliary signal having the same rising timing as that of the single input signal and a falling timing shortened as compared to that of the single input signal.

3. The power factor correction apparatus of claim 2, wherein the control unit further includes an output unit receiving the main signal of the main signal generator and the auxiliary signal of the auxiliary signal generator to output a main switching signal and an auxiliary switching signal, respectively.

4. The power factor correction apparatus of claim 3, wherein the output unit includes:
a first output unit having a first inverter inverting a signal level of the main signal of the main signal generator and a first transistor unit having a first p-channel metal oxide semiconductor (PMOS) transistor connected between a driving power supply and a ground and a first n-channel metal oxide semiconductor (NMOS) transistor connected between the first PMOS transistor and the ground and outputting the main switching signal obtained by adjusting a rising timing and a falling timing of the main signal; and
a second output unit having a second inverter inverting a signal level of the auxiliary signal of the auxiliary signal generator and a second transistor unit having a second PMOS transistor connected between the driving power supply and the ground and a second NMOS transistor connected between the second PMOS transistor and the ground and outputting the auxiliary switching signal obtained by adjusting the rising timing and the falling timing of the auxiliary signal the auxiliary switching signal having a rising timing delayed as compared to that of the input signal.

5. The power factor correction apparatus of claim 4, wherein the first transistor unit includes at least one resistor connected between the first PMOS transistor and the first NMOS transistor or connected between a connection point of the first PMOS transistor and the first NMOS transistor and an output terminal.

6. The power factor correction apparatus of claim 4, wherein the second transistor unit includes at least one resistor connected between the second PMOS transistor and the second NMOS transistor or connected between a connection point of the second PMOS transistor and the second NMOS transistor and an output terminal.

7. The power factor correction apparatus of claim 2, wherein each of the main signal generator and the auxiliary signal generator includes a delay unit delaying the rising timing or the falling timing of the single input signal.

8. The power factor correction apparatus of claim 7, wherein the auxiliary signal generator further includes an inverter inverting a level of an output signal of the delay unit, and an AND gate performing a logical AND operation between an output signal of the inverter and the single input signal.

9. The power factor correction apparatus of claim 7, wherein the auxiliary signal generator delays a rising timing or a falling timing of the signal delayed by the main signal generator.

10. The power factor correction apparatus of claim 7, wherein the delay unit includes at least two inverters connected to each other in series and a capacitor connected between a connection point of the two inverters and the ground.

11. The power factor correction apparatus of claim 10, wherein the capacitor of the delay unit of the main signal generator has capacitance higher than that of the capacitor of the delay unit of the auxiliary signal generator.

12. The power factor correction apparatus of claim 10, wherein the delay unit further includes at least two of a transistor, a resistor, and a current source that are connected between the two inverters.

13. The power factor correction apparatus of claim 1,
wherein the first inductor has one end receiving rectified power and the other end connected to a drain of the main switch; and
wherein the second inductor has one end connected to the other end of the first inductor and the other end connected to a drain of the auxiliary switch.

14. A power supplying apparatus comprising:
a power factor correction circuit including a power factor correction unit having a main switch switching rectified power to correct a power factor of input power, an auxiliary switch turned on before the main switch is turned on to form a transfer path for surplus power, a first inductor having one end receiving the rectified power and the other end connected to a drain of the main switch, and a second inductor having one end connected to the other end of the first inductor and the other end connected to a drain of the auxiliary switch, and including a control unit controlling operations of the main switch and the auxiliary switch based on a single input signal; and
a power conversion circuit converting the power having the corrected power factor from the power factor correction circuit into power having a preset voltage level.

15. The power supplying apparatus of claim 14, wherein the power conversion circuit is an inverter circuit inverting the power having the corrected power factor to convert the power into preset alternating current (AC) power.

16. The power supplying apparatus of claim 14, wherein the control unit includes:
a main signal generator including a delay unit delaying a rising timing and a falling timing of the single input signal by a preset time, respectively, to generate a main signal; and
an auxiliary signal generator including another delay unit to generate an auxiliary signal having the same rising timing as that of the single input signal and a falling timing shortened as compared to that of the single input signal.

17. The power supplying apparatus of claim 16, wherein the control unit further includes an output unit receiving the main signal of the main signal generator and the auxiliary signal of the auxiliary signal generator to output a main switching signal and an auxiliary switching signal, respectively.

18. The power supplying apparatus of claim 17, wherein the output unit includes:
a first output unit including a first inverter inverting a signal level of the main signal of the main signal generator and a first transistor unit having a first p-channel metal oxide semiconductor (PMOS) transistor connected between a driving power supply and a ground and a first n-channel metal oxide semiconductor (NMOS) transistor connected between the first PMOS transistor and the ground and outputting the main switching signal obtained by adjusting a rising timing and a falling timing of the main signal; and
a second output unit including a second inverter inverting a signal level of the auxiliary signal of the auxiliary signal generator and a second transistor unit having a second PMOS transistor connected between the driving power supply and the ground and a second NMOS transistor connected between the second PMOS transistor and the ground and outputting the auxiliary switching signal obtained by adjusting the rising timing and the falling timing of the auxiliary signal, the auxiliary switching signal having a rising timing delayed as compared to that of the input signal.

19. The power supplying apparatus of claim 18, wherein the first transistor unit includes at least one resistor connected between the first PMOS transistor and the first NMOS transistor or connected between a connection point of the first PMOS transistor and the first NMOS transistor and an output terminal, and
the second transistor unit includes at least one resistor connected between the second PMOS transistor and the second NMOS transistor or connected between a connection point of the second PMOS transistor and the second NMOS transistor and an output terminal.

20. The power supplying apparatus of claim 16, wherein the auxiliary signal generator further includes an inverter inverting a level of an output signal of the delay unit, and an AND gate performing a logical AND operation between an output signal of the inverter and the single input signal.

21. The power supplying apparatus of claim 16, wherein the auxiliary signal generator delays a rising timing or a falling timing of the signal delayed by the main signal generator.

22. The power supplying apparatus of claim 16, wherein the delay unit includes at least two inverters connected to each other in series and a capacitor connected between a connection point of the two inverters and the ground, and
the capacitor of the delay unit of the main signal generator has capacitance higher than that of the capacitor of the delay unit of the auxiliary signal generator.

23. The power supplying apparatus of claim 16, wherein the delay unit further includes at least two of a transistor, a resistor, and a current source that are connected between the two inverters.

24. A motor driving apparatus comprising:
a power factor correction circuit including a power factor correction unit having a main switch switching rectified power to correct a power factor of input power, an auxiliary switch turned on before the main switch is turned on to form a transfer path for surplus power, a first inductor having one end receiving the rectified power and the other end connected to a drain of the main switch, and a second inductor having one end connected to the other end of the first inductor and the other end connected to a drain of the auxiliary switch, and including a control unit controlling operations of the main switch and the auxiliary switch based on a single input signal; and
an inverter circuit inverting the power having the corrected power factor from the power factor correction circuit into preset AC power to drive a motor.

25. The motor driving apparatus of claim 24, wherein the control unit includes:
a main signal generator generating a main signal by delaying a rising timing and a falling timing of the single input signal by a preset time, respectively; and
an auxiliary signal generator generating an auxiliary signal having the same rising timing as that of the single input signal and a falling timing shortened as compared to that of the single input signal.

26. The motor driving apparatus of claim 25, wherein the control unit further includes an output unit receiving the main signal of the main signal generator and the auxiliary signal of the auxiliary signal generator to output a main switching signal and an auxiliary switching signal, respectively.

27. The motor driving apparatus of claim 26, wherein the output unit includes:

a first output unit including a first inverter inverting a signal level of the main signal of the main signal generator and a first transistor unit having a first p-channel metal oxide semiconductor (PMOS) transistor connected between a driving power supply and a ground and a first n-channel metal oxide semiconductor (NMOS) transistor connected between the first PMOS transistor and the ground and outputting the main switching signal obtained by adjusting a rising timing and a falling timing of the main signal; and a second output unit including a second inverter inverting a signal level of the auxiliary signal of the auxiliary signal generator and a second transistor unit having a second PMOS transistor connected between the driving power supply and the ground and a second NMOS transistor connected between the second PMOS transistor and the ground and outputting the auxiliary switching signal obtained by adjusting the rising timing and the falling timing of the auxiliary signal, the auxiliary switching signal having a rising timing delayed as compared to that of the input signal.

28. The motor driving apparatus of claim 27, wherein the first transistor unit includes at least one resistor connected between the first PMOS transistor and the first NMOS transistor or connected between a connection point of the first PMOS transistor and the first NMOS transistor and an output terminal, and the second transistor unit includes at least one resistor connected between the second PMOS transistor and the second NMOS transistor or connected between a connection point of the second PMOS transistor and the second NMOS transistor and an output terminal.

29. The motor driving apparatus of claim 25, wherein the auxiliary signal generator further includes an inverter inverting a level of an output signal of the delay unit, and an AND gate performing a logical AND operation between an output signal of the inverter and the single input signal.

30. The motor driving apparatus of claim 25, wherein the auxiliary signal generator delays a rising timing or a falling timing of the signal delayed by the main signal generator.

31. The motor driving apparatus of claim 25, wherein the delay unit includes at least two inverters connected to each other in series and a capacitor connected between a connection point of the two inverters and the ground, and the capacitor of the delay unit of the main signal generator has capacitance higher than that of the capacitor of the delay unit of the auxiliary signal generator.

32. The motor driving apparatus of claim 25, wherein the delay unit further includes at least two of a transistor, a resistor, and a current source that are connected between the two inverters.

* * * * *